(No Model.)
S. W. BABBITT.
COMBINED SINK TRAP AND SAFETY POCKET.
No. 286,759. Patented Oct. 16, 1883.
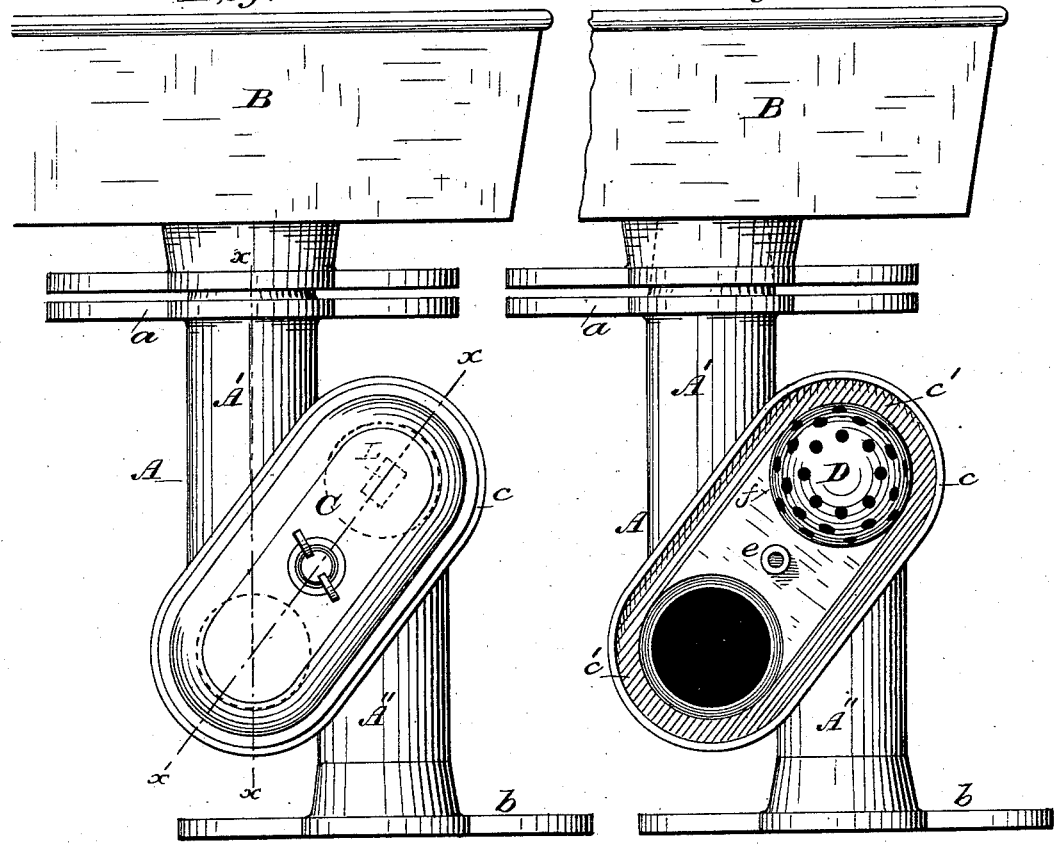
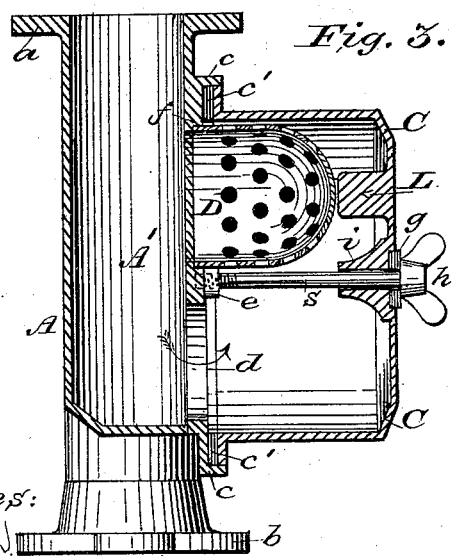
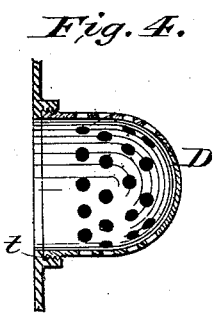
Witnesses:
Inventor:
S. William Babbitt,
By T. C. Brecht,
Attorney.

UNITED STATES PATENT OFFICE.

S. WILLIAM BABBITT, OF MERIDEN, CONNECTICUT.

COMBINED SINK-TRAP AND SAFETY-POCKET.

SPECIFICATION forming part of Letters Patent No. 286,759, dated October 16, 1883.

Application filed January 30, 1883. (No model.)

*To all whom it may concern:*

Be it known that I, S. WILLIAM BABBITT, a citizen of the United States, residing at Meriden, in the county of New Haven and State of Connecticut, have invented certain new and useful Improvements in Combined Sink-Trap and Safety-Pocket; and I do hereby declare the following to be a full, clear, and exact description of the invention, such as will enable others skilled in the art to which it appertains to make and use the same.

My invention relates to improvements in combined sink-trap and safety-pocket. It is a well-known fact that very often rings and other valuable articles of like nature are by accident lost in washing hands, &c., by passing into the openings connecting with the waste-pipes of sinks, and also that said pipes are often stopped up by solid pieces of offal or other solid matter thrown into the sinks, and thereby great expense is caused to find such articles or to clean out the pipes; and to overcome these annoyances and troubles is the object of my invention.

My invention consists in providing a trap for sinks with a safety-pocket, made, preferably, removable, and consisting of a strainer to permit the free passage of the water. This strainer is also made removable, although it may be made permanent, if desired, and by it the article, whatever it may be, is prevented from passing into the waste-pipe, and is accessible for removal, &c., from the pocket without much trouble or expense.

It also consists in arranging this strainer in the upper part of the pocket to prevent clogging, as it will be constantly washed out by the water; and it also consists in the construction and arrangement of parts, as will be more fully described hereinafter and more specifically pointed out in the claims, reference being had to the accompanying drawings and the letters of reference marked thereon.

Like letters of reference indicate like parts in the different figures of the drawings, in which—

Figure 1 represents a side elevation of my improved trap and safety-pocket attached to a sink. Fig. 2 is a side elevation of the same, showing the strainer and safety-pocket removed. Fig. 3 is a cross-section on line $x\ x$. Fig. 4 is a modification of the manner of securing the strainer in place.

In the drawings, A represents a trap having the ordinary bend or curve to form a water-seal, and is provided with a flange, $a$, to secure it to the sink B, while another flange, $b$, serves to connect it with the ordinary waste-pipe. Instead of the flanges, the joints may be of the screw kind; or any other suitable fastenings may be employed. On the side of this trap is secured, on a suitable seat, what I term a "safety-pocket," C, made removable. It communicates at its lower end with the inlet part or leg A' of the trap, and with its upper end with the outlet part or leg A'' of the same. This pocket is held against the seat $d$ on the side of the trap, and in a flange, $c$, and between the face of said pocket and the seat $d$ is placed a washer, $c'$, of rubber or other suitable material, which serves to form a tight joint between the face of the pocket and the seat on the trap. The pocket is secured in place by a screw or bolt, $s$, which is screwed into a lug or projection, $e$, on the pocket-seat of the trap. Over the outlet-opening, which communicates with the pocket, is arranged a strainer, D, which may be loosely inserted into a recess, $f$, cast in the seat for the pocket, and it is held in its place by a lug, L, cast or otherwise secured to the inner side of the pocket C, and said lug comes in contact with the strainer D and prevents it from leaving its recess $f$ until the pocket is removed, when it also can be removed. The strainer D may, however, be provided with a screw-thread, $t$, as shown in Fig. 4, by which it is then secured in place in a correspondingly screw-threaded recess. To prevent any leakage around the bolt $s$, a washer, $g$, is arranged in a recess in the back of the pocket, and the thumb-head $h$ of the bolt $s$ is then screwed against said washer. A hub, $i$, is preferably cast on the inner side of the back of the pocket, through which the bolt passes, and can be steadied, so that it can be more easily entered into the hole in the lug $e$ when it is desired to screw it into place.

By placing the strainer at the upper end of the pocket, (which is a very important feature of my invention,) it is not so liable to become clogged up, as it will be continually washed out by the water; and by arranging the washers between the face of the pocket, within a flange and against the seat, no leakage is liable to occur, which is also prevented by the washer $g$ around the bolt $s$. The pocket may also be secured in position by a screw-thread; or it may be provided with an annular flange and be then secured by bolts, if desired, without deviating from the spirit of my invention.

Many different ways of securing the pocket in position would readily suggest themselves to the mechanic, and the form may be varied to suit different circumstances, and I do not confine myself to the safety-pocket herein shown and described.

Any suitable material may be employed in the construction of the trap and pocket.

The operation is as follows: If, by accident or carelessness, a person using the sink or in washing the hands should drop a ring or any other article of value, which would fall into the trap, it is only necessary to remove the pocket and its cap, when the article could be removed or regained from the pocket, which it could not pass. If solid materials or scraps should have gained access into the pocket and stop it up, it could be readily removed in a similar manner. The pocket, with its strainer, is then replaced, and any water could freely pass off, while all solid matter would be retained. The water first descends from the sink B down through the leg A', then passes sidewise into the pocket C, and up to the outlet-opening through the perforated cap D, and down the leg A'' into the waste-pipe.

Having thus described my invention, what I claim, and desire to secure by Letters Patent, is—

1. A sink-trap, A, having the legs A' A'', connected by a removable pocket, C, fitting on a seat on the side of said legs, and provided with a flange, $c$, for the washer $c'$, and secured by a bolt, $s$, as shown and specified.

2. A sink-trap having legs A' A'', connected by a removable pocket, C, secured by a bolt, $s$, and provided at the outlet-opening with a perforated cap, D, substantially as set forth.

3. A sink-trap having legs A' A'', connected by a removable pocket, C, provided with a lug, L, for holding the perforated cap D in its seat, substantially as specified.

4. A sink-trap having legs A' A'', connected by a removable pocket, C, secured by a bolt, $s$, and provided with a lug, L, in combination with a removable perforated cap, D, arranged over the outlet-opening and at the upper part of the pocket C, all substantially as specified.

5. A removable safety-pocket, C, connecting the two legs A' A'' of a sink-trap, and provided with a perforated cap, D, arranged over the outlet-opening, substantially in the manner shown and specified.

6. The combination of the sink-trap A, having a seat, $d$, provided with flange $c$, with the safety-pocket C, washer $c'$, and bolt $s$, arranged substantially as specified.

7. The combination of the sink-trap A, having seat $d$, provided with flange $c$, with the safety-pocket C, washer $c'$, bolt $s$, and washer $g$, all arranged substantially as set forth.

8. In combination with a sink-trap, A, having inlet and outlet, arranged, as shown, with the safety-pocket C, strainer D, arranged over the outlet-opening, and held in place by the lug L and the bolt $s$, all constructed and arranged substantially as shown and specified.

In testimony whereof I affix my signature in presence of two witnesses.

SETH WILLIAM BABBITT.

Witnesses:
  WM. A. PELTON,
  LEWIS HALL.